Patented Jan. 13, 1942

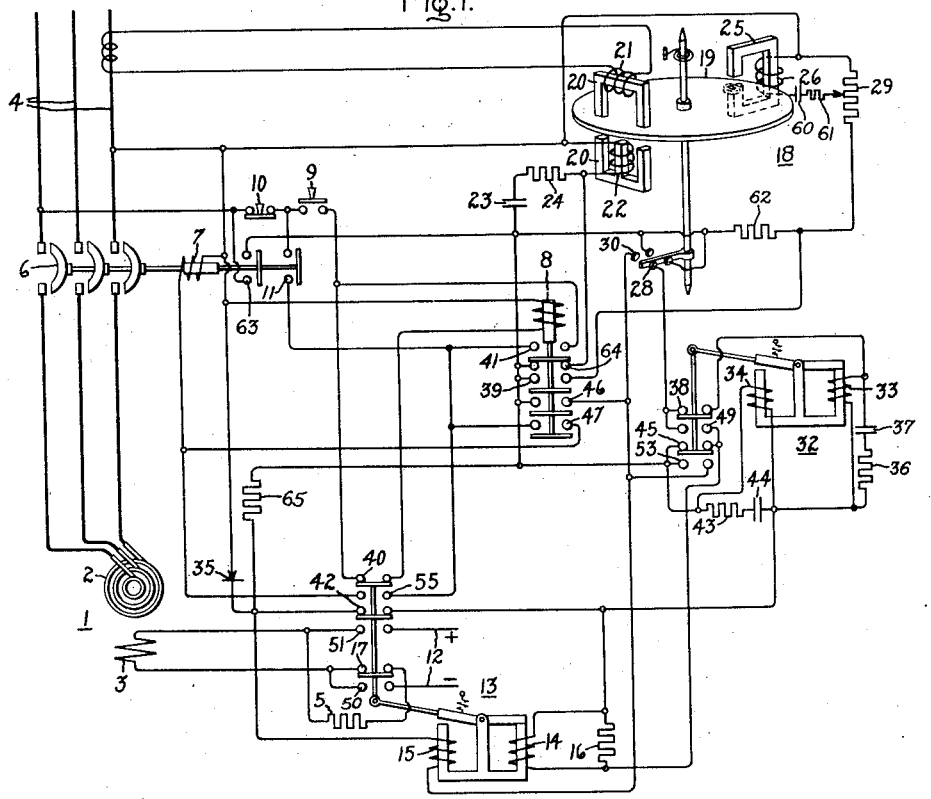

2,269,972

UNITED STATES PATENT OFFICE 2,269,972

CONTROL SYSTEM FOR SYNCHRONOUS MACHINES

Maynord N. Halberg, Scotia, N. Y., assignor to General Electric Company, a corporation of New York Application September 23, 1939, Serial No. 296,271

17 Claims. (Cl. 172—289)

My invention relates to control systems for synchronous machines and particularly to a system for effecting predetermined changes in the connections of a subsynchronously operating synchronous machine at predetermined points in the slip cycle when it is operating at a predetermined subsynchronous speed.

One object of my invention is to provide an improved arrangement of apparatus which can be easily adjusted so as to change the minimum subsynchronous speed at which the desired connection changes can be effected without materially changing the range in the slip cycle at which the connection changes are effected.

My invention will be better understood from the following description when taken in connection with the accompanying drawing and its scope will be pointed out in the appended claims.

In the accompanying drawing Fig. 1 diagrammatically illustrates a synchronous motor excitation control system embodying my invention and Figs. 2 and 3 are explanatory diagrams.

Referring to Fig. 1 of the accompanying drawing, 1 represents a synchronous motor having an armature winding and a field winding 3. In order to simplify the disclosure, I have shown my invention in connection with a full voltage starting system whereby the motor is started as an induction motor by connecting the motor armature winding 2 directly to an alternating current supply circuit 4 while the field winding 3 is short-circuited through a discharge resistor 5. As shown, the armature winding 2 is arranged to be connected directly to the alternating current circuit 4 by means of a switch 6 having a closing coil 7 that is arranged to be energized from one phase of the supply circuit 4 when a control relay 8 is energized. The control relay 8, in turn, is arranged to be energized in response to the closing of a control switch 9 which is shown as a manually operated device, but it will be obvious to those skilled in the art that it may be automatically controlled in any suitable manner so that it is closed when it is desired to start the motor 1. In the energizing circuit of the control relay 8, I also provide the contacts of a normally closed switch 10 which is controlled in any suitable manner so that its contacts are opened when it is desired to stop the motor 1. The switch 6, when closed, completes through its auxiliary contacts 11, locking circuits for the closing coil 7 and the winding of control relay 8.

The field winding 3 of the motor 1 is arranged to be connected to a suitable source of excitation 12 by means of a field switch 13 which may be of any suitable construction. As shown, the field switch has a holding winding 14 which, when energized, tends to maintain the field switch in its open position, which is the position in which it is shown, and a closing winding 15 which, when energized, tends to move the switch to its closed position. The switch 13 is so constructed that the winding 15 can move the switch to its closed position only after the winding 14 has been deenergized for a predetermined time. A resistor 16 of the proper resistance value is connected in parallel with the holding winding 14 for obtaining this predetermined time delay. When the field switch 13 is in its open position, its auxiliary contacts 17 connect the discharge resistor 5 across the terminals of the field winding 3.

For controlling the closing and opening of the field switch 13, I have shown a motor armature impedance relay arrangement of the type disclosed and claimed in United States Letters Patent 2,151,160 granted March 21, 1939, to the assignee of this application on an application by Harold T. Seeley. As shown, this relay arrangement comprises an impedance relay 18 having a rotatable member 19 and a cooperating wattmetric driving element 20 that includes a current winding 21 energized in response to the current in one of the phase conductors supplying current to the motor armature winding 2 and a voltage winding 22 connected in series with a capacitor 23 and a resistor 24 across one of the phases of the supply circuit 4. The driving element 20 therefore exerts a torque which is a function of the supply circuit voltage and the motor armature current. The rotatable element 19 is also provided with another driving element 25 which has a voltage winding 26 connected in series with a capacitor 60 and the resistors 61 and 62 to one phase of the supply circuit through the contacts of switch 10 and auxiliary contacts of the circuit breaker 6 when it is closed. The driving element 25 exerts a torque proportional to the square of supply circuit voltage in a direction to open contacts 28 so that the operation of the relay 18 varies with the impedance of the motor armature circuit. The voltage restraining torque exerted by the driving element 25 may be varied by means of a suitable potentiometer 29 associated with the winding 26.

By varying the relative phases of the currents in the windings 21 and 22 of the relay 18 in any well known manner, as for example by varying the electrical constants of the circuit of one or both of the windings 21 and 22, the zero torque characteristic of the relay, which is substantially a straight line, can be made to have any desired slope, and by adjusting the potentiometer 29 so as to vary the torque exerted by the driving element 25, the distance of this zero torque characteristic from the origin can be adjusted to any desired value. If the relay 18 is adjusted so that it has a zero torque characteristic, represented by the line MM' in Fig. 2, the relay 18 maintains its contacts 28 closed and its contacts 30 open whenever the magnitude and phase angle of the motor armature current is such that the current vector terminates at the right of the line MM' and opens its contacts 28 and closes its contacts 30 whenever the magnitude and phase angle of the motor armature current is such that the current vector terminates at the left of the line MM'. It will be seen that with this relay characteristic the motor speed has to increase to nearly 96% of synchronous speed before the armature current pulsations are of such a character that the relay 18 opens its contacts 28 and closes its contacts 30 during any portion of a current pulsation cycle. In this Fig. 2 the various circles represent the loci of the ends of the motor armature current vectors at a number of speeds near synchronous speed. From this figure it will be seen that up to a predetermined speed, the motor armature current vector terminates continuously at the right of the zero torque characteristic MM'. As the motor speed increases above this predetermined value, the armature current vector terminates at the left of the zero torque characteristic MM' for an increasingly longer portion of each half cycle of slip. Since, as the slip decreases, the length of time of each slip cycle also increases, the length of time the motor armature current vector terminates at the left of the zero torque characteristic MM' during each half cycle of slip when the motor speed is above said predetermined value increases very rapidly for a small change in slip. For example, it is at least 50% longer when the motor is operating at 2% slip than at 3% slip.

By having the opening of the contacts 28 of relay 18 initiate the operation of a definite time relay, the timing operation of which is such that when the motor 1 is operating at the desired minimum synchronizing speed, the timing operation is completed just as the contacts 28 reclose, this time relay will complete its timing operation at either of two definite points in the slip cycle which are substantially 180° or a half cycle apart, when the motor is operating at the desired minimum synchronizing speed. The reason there are two points, substantially 180° apart, in each slip cycle is because there is a pulsation in the armature current each time the unexcited salient field poles of the motor slip one pole pitch with respect to the rotating armature field poles.

In the embodiment of my invention shown in the drawing, the relay 18 has associated therewith a time relay 32 having a holding winding 33 which, when energized, tends to maintain the relay in its normally open position, which is the position in which it is shown, and a closing winding 34, which, when energized, tends to move the relay to its closed position. While the relay 32 is in its normally open position, energizing circuits are respectively completed for the windings 33 and 34 across one phase of the supply circuit 4 through a suitable rectifier 35. The winding 33 is permanently shunted by the series connected resistor 36 and capacitor 37 and the winding 34 is permanently shunted by the series connected resistor 43 and capacitor 44. The circuit of the winding 33 also includes, in series, the normally closed contacts 28 of relay 18, and the normally closed contacts 38 of the relay 32. Until the contacts 28 are opened continuously for a predetermined time interval, which depends upon the size of the condenser 37 and resistor 36, the holding winding 33 prevents the energized operating winding 34 from moving the relay 32 to its closed position. When the relay 32 moves to its closed position, it changes the connections of the holding winding 14 of the field switch 13 so that the contacts 28 of relay 18 are connected in series therewith. Therefore, the circuits to the holding windings of the time relay 32 and the field switch 13 are opened at the same points in the half slip cycle when the motor is operating at the minimum speed at which it will effect the operation of the time relay 32. This is an important feature of my present invention.

I have found from tests that if field excitation is applied near the point of minimum relay torque, that is, near the mid point of the arc of the circle in Fig. 2 during which time the contacts 28 are open, when the motor is operating at the minimum speed at which it will effect the operation of the relay 32 and the zero torque characteristic MM' has a slope of 45°, one of the two points in the slip cycle at which the field excitation is applied is near the best point in the slip cycle to apply excitation and the other point, which is displaced substantially 180° from the best point, is also a very good point to apply excitation compared to the worst point in the slip cycle. This will be seen more clearly from Fig. 3 which shows the per unit load torque that can be synchronized with excitation voltage applied at various points in the slip cycle. If the excitation is applied at point X, which is the best point in the slip cycle and at point Y, which is displaced 180° from point X, the synchronizing torque developed by the motor when excitation is applied at either of these two points is materially greater than when it is applied at the worst point Z in the slip cycle.

The operation of the embodiment of my invention shown in Fig. 1 is as follows: When it is desired to start the motor 1, the control switch 9 is closed to complete through the normally closed contacts of the control switch 10 and the contacts 40 of the field switch 13, an energizing circuit for the control relay 8 across one phase of the supply circuit 4.

By closing its contacts 41 and 47, the control relay 8 completes an energizing circuit for the closing coil 7 of the switch 6 across one phase of the supply circuit 4. The circuit of the closing coil 7 also includes the contacts of the control switches 9 and 10. By closing its auxiliary contacts 11, the switch 6 completes a shunt circuit around the contacts of the control switch 9 and the contacts 41 of relay 8 in the energizing circuit of the closing coil 7. The contacts 11 also complete a locking circuit for relay 8 through its contacts 41.

By closing its auxiliary contacts 63, the switch 6 completes energizing circuits for the voltage windings 22 and 26 of the relay 18 across one phase of the supply circuit 4. The circuit of the voltage winding 22 also includes the series connected resistor 24 and capacitor 23, which are shunted by the contacts 64 of the relay 8 when it is energized. The circuit of the voltage winding 26 includes the potentiometer 29 and the capacity 60 and the resistors 61 and 62, the latter of which is shunted by the contacts 39 of relay 8 when it is energized. The closing of the contacts 63 of the switch 6 also completes energizing circuits for the windings 33 and 34 of the time relay 32 and the windings 14 and 15 of the field switch 13 across one phase of the supply circuit 4. The circuit of the holding winding 33 which is permanently shunted by the series connected resistor 36 and capacitor 37 also includes the rectifier 35, contacts 42 of field switch 13, contacts 38 of relay 32, and contacts 28 of relay 18. The circuit of the operating winding 34, which is permanently shunted by the series connected resistor 43 and capacitor 44, also includes the rectifier 35, and the contacts 42 of the field switch 13. The circuit of the holding winding 14 of the field switch 13 and of the resistor 16, which is permanently connected in parallel with the winding 14, also includes the rectifier 35, contacts 42 of the field switch 13, and the contacts 45 of the time relay 32. The circuit of the operating winding 15 of the field switch 13 also includes the rectifier 35, and the contacts 46 of the relay 8. Although the operating windings 15 and 34 are energized, they cannot effect the operation of the field switch 13 and the time relay 32 respectively until after their respective holding windings have been deenergized for a predetermined time.

The closing of the contacts 63 of switch 6 also connects a resistor 65 in parallel with the winding 15 and contact 46 of relay 8 so as to give a higher average voltage across the winding 15 from the rectifier 35.

The closing of the main contacts of switch 6 connects the armature winding 2 of the motor 1 directly across the supply circuit 4 so that the motor 1 starts and accelerates as an induction motor. During the starting operation, the motor field winding 3 is connected in circuit with the discharge resistor 5 by the contacts 17 of the field switch 13.

From Fig. 2 it will be seen that, when the motor 1 is operating at a high slip, the magnitude and phase of the motor armature current are such that the loci of the ends of the armature current vector are entirely to the right of the zero torque characteristic MM' so that the relay 18 maintains its contacts 28 closed continuously and it is not until the motor reaches a speed near synchronous speed that the locus of the end of the armature current vector crosses the zero torque characteristic MM' and causes the relay 18 to open its contacts 28 during a portion of each half slip cycle. The opening of the contacts 28 interrupts the energizing circuit of the holding winding 33 of relay 32, but due to the series connected resistor 36 and capacitor 37 around the winding 33, the operating winding 34 does not effect the operation of the relay 32 until the energizing circuit of the holding winding 33 remains continuously interrupted for a predetermined time.

When the motor 1 reaches the desired minimum synchronizing speed, which is usually the maximum speed to which the motor can accelerate its maximum starting load, the contacts 28 remain open just long enough during each half slip cycle to effect the operation of the relay 32. By opening its contacts 38 in the circuit of the holding winding 33, the relay 32 insures that it will remain in its operated position when the contacts 28 reclose. By opening its contacts 45 and closing its contacts 49, the relay 32 transfers the connections of the holding winding 14 of the field switch 13 so that the contacts 28 are connected in series therewith. Therefore, when the contacts 28 are open during the next half slip cycle, the circuit of the holding winding 14 is opened for a sufficient length of time to allow the operating winding 15 to close the field switch 13. For example, if in Fig. 2 the arc CBA represents the length of time during each half slip cycle the contacts 28 are open when the motor is operating at a 3% slip and this length of time is just equal to the time delay of relay 32, the relay 32 will operate at point A which is a definite point in the slip cycle. If the total operating time of the field switch 13 is made equal to half the time delay of the relay 32, then during the next half cycle of slip the field switch 13 closes at point B which is the mid point of the arc CBA and which is either near the best point in the slip cycle to apply excitation or 180° from the best point.

By opening its auxiliary contacts 17 and closing its main contacts 50 and 51 the field switch 13 disconnects the field winding 3 from the discharge resistor 5 and connects the field winding 3 to the source of excitation 12. By opening its auxiliary contacts 42, the field switch 13 interrupts the circuits of the holding winding 14 of the field switch 13 and the operating winding 34 of the time relay 32. After a time delay, determined by the resistor 43 and capacitor 44, the time relay 32 opens its contacts 49 and 53.

By opening its contacts 40, the field switch 13 effects the deenergization of the control relay 8, which by opening its contact 46 interrupts the original energizing circuit of the operating winding 15 of the field switch 13. After the field switch 13 closes and until the time relay 32 opens, an energizing circuit is maintained for the operating winding 15 through the contacts 53 of the relay 32. By the time the relay 32 operates to open its contacts 53, which time is made long enough to allow the motor to pull into synchronism and the motor armature current to reach a steady value, an energizing circuit for the operating winding 15 of the field switch 13 is completed through the contacts 30 of the relay 18, which remain closed as long as the motor remains in synchronism.

By opening its contacts 39, the control relay 8 removes the short circuit from around the resistor 62 in the energizing circuit of the voltage winding 25 of the relay 18 and by closing its contacts 64 completes a shunt circuit around the capacitor 23 and resistor 24 in the energizing circuit of the winding 22 so that the zero torque characteristic of the relay is changed from MM' to NN'. The opening of the contacts 47 of the relay 8 interrupts the original energizing circuit for the closing coil 7 of switch 6 but this coil does not become deenergized at this time because the auxiliary contacts 55 of field switch 13, which are in parallel with the contacts 47, are closed.

As long as the motor 1 remains in synchronism, the magnitude and phase angle of the armature current are such that the current vector terminates on the left-hand side of the zero torque characteristic NN' so that the contacts 30 of relay 18 remain closed. When, however, the motor 1 falls out of synchronism, the motor armature current vector terminates on the right-hand side of the zero torque characteristic NN' and the relay 18 opens its contacts 30 in the circuit of the operating winding 15 of the field switch 13. The field switch 13 immediately moves to its open position thereby disconnecting the field winding 3 from the source of excitation 12 and reconnecting the discharge resistor 5 across the terminals of the field winding 3. By opening its auxiliary contacts 55, the field switch 13 opens the circuit of the closing coil 7 of the switch so that the motor armature winding 2 is disconnected from the supply circuit 4 to shut down the motor.

If it is desired to change the minimum synchronizing speed at which the field excitation is applied, this can be done merely by adjusting the potentiometer 29 which changes the distance of the zero torque characteristic MM' in Fig. 2 from its origin without materially changing the points in the slip cycle at which the field excitation is applied when the motor is operating at the new minimum synchronizing speed. This will be apparent from Fig. 2 in which the line PP' represents the zero torque characteristic of the relay 18 when the potentiometer has been adjusted so the minimum speed at which the field excitation can be applied is 98% synchronous speed. When the motor is operating at this minimum synchronizing speed, the contacts 28 open at point C' and close at point A' during each half cycle pulsation of armature current. Since the operating time of the field switch 13 is equal to half the operating time of relay 32, the field switch 13 closes at point B' which is the midpoint of the arc C'B'A'. Since the point B' is near the point of minimum relay torque, the field excitation is applied at a point near the best point in the slip cycle or 180° therefrom when the motor is operating at the new minimum synchronizing speed.

Therefore, after the operating times of the time relay 32 and the field switch 13 have been properly adjusted relatively to each other to apply the field excitation at proper points in the slip cycle for a given minimum synchronizing speed, no further adjustment of these operating times is required when the minimum synchronizing speed is changed by adjusting the potentiometer 29.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In a system including an alternating current supply circuit connected to a synchronous machine, a control arrangement including a timing device having a definite operating time, control means for effecting the operation of said timing means only during a predetermined magnitude and phase range of the armature current of said machine relative to the armature voltage of said machine, a second timing device, and means controlled by said first timing device and said control means for effecting the timing operation of said second timing device only during said predetermined magnitude and phase range of armature current after said first timing device has completed its timing operation.

2. In a system including an alternating current supply circuit connected to a synchronous machine, a control arrangement including a timing device having a definite operating time, control means for effecting the operation of said timing means only during a predetermined magnitude and phase range of the armature current of said machine relative to the armature voltage of said machine, a second timing device, means controlled by said first timing device and said control means for effecting the timing operation of said second timing device only during said predetermined magnitude and phase range of armature current after said first timing device has completed its timing operation, and means for controlling said control means so as to vary the predetermined range of armature current during which said control means can effect the operation of said timing means.

3. In a system including an alternating current supply circuit connected to a synchronous machine, a control arrangement including a timing device having a definite operating time, control means for effecting the operation of said timing means only during a predetermined magnitude and phase range of the armature current of said machine relative to the armature voltage of said machine, a second timing device having an operating time less than the operating time of said first timing means, and means controlled by said first timing device and said control means for effecting the timing operation of said second timing device only during said predetermined magnitude and phase range of armature current after said first timing device has completed its timing operation.

4. In a system including an alternating current supply circuit connected to a synchronous machine, a control arrangement including a timing device having a definite operating time, control means for effecting the operation of said timing means only during a predetermined magnitude and phase range of the armature current of said machine relative to the armature voltage of said machine, a second timing device having an operating time less than the operating time of said first timing means, means controlled by said first timing device and said control means for effecting the timing operation of said second timing device only during said predetermined magnitude and phase range of armature current after said first timing device has completed its timing operation, and means for controlling said control means so as to vary the predetermined range of armature current during which said control means can effect the operation of said timing means.

5. In a system including an alternating current supply circuit connected to a synchronous machine, a control arrangement including a timing device having a definite operating time, control means for effecting the operation of said timing means only during a predetermined magnitude and phase range of the armature current of said machine relative to the armature voltage of said machine, a second timing device having an operating time substantially equal to half the operating time of said first timing means, and means controlled by said first timing device and said control means for effecting the timing operation of said second timing device only during said predetermined magnitude and phase range of armature current after said first timing device has completed its timing operation.

6. In a system including an alternating current supply circuit connected to a synchronous machine, a control arrangement including a timing device having a definite operating time, control means for effecting the operation of said timing means only during a predetermined magnitude and phase range of the armature current of said machine relative to the armature voltage of said machine, a second timing device having an operating time substantially equal to half the operating time of said first timing means, means controlled by said first timing device and said control means for effecting the timing operation of said second timing device only during said predetermined magnitude and phase range of armature current after said first timing device has completed its timing operation, and means for controlling said control means so as to vary the predetermined range of armature current during which said control means can effect the operation of said timing means.

7. In a system including an alternating current supply circuit connected to a synchronous machine, a control arrangement including a timing edvice having a definite operating time, control means for effecting the operation of said timing means only during a predetermined magnitude and phase range of the armature current of said machine relative to the armature voltage of said machine, a second timing device, means controlled by said first timing device and said control means for effecting the timing operation of said second timing device only during said predetermined magnitude and phase range of armature current after said first timing device has completed its timing operation, and means responsive to said second timing means completing its timing operation for effecting a predetermined change in the connections of said machine.

8. In a system including an alternating current supply circuit connected to a synchronous machine, a control arrangement including a timing device having a definite operating time, control means for effecting the operation of said timing means only during a predetermined magnitude and phase range of the armature current of said machine relative to the armature voltage of said machine, a second timing device having an operating time less than the operating time of said first timing means, means controlled by said first timing device and said control means for effecting the timing operation of said second timing device only during said predetermined magnitude and phase range of armature current after said first timing device has completed its timing operation, and means responsive to said second timing means completing its timing operation for effecting a predetermined change in the connections of said machine.

9. In a system including an alternating current supply circuit connected to a synchronous machine, a control arrangement including a timing device having a definite operating time, control means for effecting the operation of said timing means only during a predetermined magnitude and phase range of the armature current of said machine relative to the armature voltage of said machine, a second timing device having an operating time substantially equal to half the operating time of said first timing means, means controlled by said first timing device and said control means for effecting the timing operation of said second timing device only during said predetermined magnitude and phase range of armature current after said first timing device has completed its timing operation, and means responsive to said second timing means completing its timing operation for effecting a predetermined change in the connections of said machine.

10. In a system including an alternating current supply circuit connected to a synchronous machine, a control arrangement including a timing device having a definite operating time, control means for effecting the operation of said timing means only during a predetermined magnitude and phase range of the armature current of said machine relative to the armature voltage of said machine, a second timing device, means controlled by said first timing device and said control means for effecting the timing operation of said second timing device only during said predetermined magnitude and phase range of armature current after said first timing device has completed its timing operation, and means responsive to said second timing means completing its timing operation for effecting a change in the field connections of said machine.

11. In a system including an alternating current supply circuit connected to a synchronous machine, a control arrangement including a timing device having a definite operating time, control means for effecting the operation of said timing means only during a predetermined magnitude and phase range of the armature current of said machine relative to the armature voltage of said machine, a second timing device having an operating time less than the operating time of said first timing means, means controlled by said first timing device and said control means for effecting the timing operation of said second timing device only during said predetermined magnitude and phase range of armature current after said first timing device has completed its timing operation, and means responsive to said second timing means completing its timing operation for effecting a change in the field connections of said machine.

12. In a system including an alternating current supply circuit connected to a synchronous machine, a control arrangement including a timing device having a definite operating time, control means for effecting the operation of said timing means only during a predetermined magnitude and phase range of the armature current of said machine relative to the armature voltage of said machine, a second timing device having an operating time substantially equal to half the operating time of said first timing means, means controlled by said first timing device and said control means for effecting the timing operation of said second timing device only during said predetermined magnitude and phase range of armature current after said first timing device has completed its timing operation, and means responsive to said second timing means completing its timing operation for effecting a change in the field connections of said machine.

13. In a system including an alternating current supply circuit connected to an unexcited subsynchronously operating synchronous machine, speed responsive means dependent upon the motor armature current remaining within a predetermined magnitude and phase range relative to the motor armature voltage for a predetermined time, means for varying the minimum speed at which said speed responsive means responds, and means controlled by said speed responsive means for effecting a predetermined change in the connections of said machine at substantially the same predetermined points in the slip cycle whenever said machine is operating at the minimum speed for which said speed responsive means is adjusted to respond.

14. In a system including an alternating current supply circuit connected to an unexcited subsynchronously operating synchronous machine, speed responsive means dependent upon the motor armature current remaining within a predetermined magnitude and phase range relative to the motor armature voltage for a predetermined time, means for varying the minimum speed at which said speed responsive means responds, and means controlled by said speed responsive means for effecting a predetermined change in the field connections of said machine at substantially the same predetermined points in the slip cycle whenever said machine is operating at the minimum speed for which said speed responsive means is adjusted to respond.

15. In a system including an alternating current supply circuit connected to an unexcited subsynchronously operating synchronous machine, speed responsive means dependent upon the motor armature current remaining within a predetermined magnitude and phase range relative to the motor armature voltage for a predetermined time, means for varying the minimum speed at which said speed responsive means responds, and means controlled by said speed responsive means for effecting the application of excitation to the field winding of said machine at substantially the same predetermined points in the slip cycle whenever said machine is operating at the minimum speed for which said speed responsive means is adjusted to respond.

16. In a system including an alternating current supply circuit connected to a subsynchronously operating synchronous machine, speed responsive means dependent upon the impedance of the armature circuit of said machine, means for varying the minimum speed at which said speed responsive means responds, and means controlled by said speed responsive means for effecting a predetermined change in the connections of said machine at substantially the same predetermined points in the slip cycle whenever said machine is operating at the minimum speed for which said speed responsive means is adjusted to respond.

17. In a system including an alternating current supply circuit connected to an unexcited subsynchronously operating synchronous machine, speed responsive means dependent upon the impedance of the armature circuit of said machine, means for varying the minimum speed at which said speed responsive means responds, and means controlled by said speed responsive means for effecting the application of excitation to the field winding of said machine at points in the slip cycle favorable for synchronizing said machine whenever said machine is operating at the minimum speed for which said speed responsive means is adjusted to respond.

MAYNORD N. HALBERG.